3,057,824
TIN SALTS AS CATALYSTS IN FORMING POLYESTERS

Louis R. Le Bras, Pittsburgh, and Donald F. Stahr, Arnold, Pa., assignors to Pittsburgh Plate Glass Company, Allegheny County, Pa., a corporation of Pennsylvania
No Drawing. Filed Mar. 31, 1959, Ser. No. 803,081
8 Claims. (Cl. 260—75)

This invention relates to the preparation of polyesters such as are employed as hydroxy-containing components in polyurethane resins, used in coating and in foams such as are employed as thermal insulators, as cushioning members, as buoyancy elements, as potting resins and for various other applications, and it has particular relation to improvements in the catalysis in the preparation of such polyesters by direct reaction of a polyol and a polycarboxylic acid or polycarboxylic acid anhydride.

Reactions of esterification involved in the preparation of such polyesters as are employed in the preparation of polyurethane resins or as potting resins and for other purposes, may be effected by heating a mixture of a dicarboxylic acid (or its anhydride) that does not readily react by addition, with a polyhydric alcohol such as a glycol, glycerol or a polymethylol compound. Esterification will take place even in the absence of catalysts. However, the reaction requires a long time, e.g., 16 or 18 hours, to obtain acid numbers of 3 or less. For this reason, it is usually preferred to incorporate into the reaction mixture a catalyst, of which p-toluenesulfonic acid is a classic example and the one heretofore most commonly used. This material effectively reduces cooking time for the esterifiable mixture. However, such use is attended by serious objectionable features such as:

(A) A tendency to discolor the product; water-white esters being substantially impossible to obtain by this method.

(B) It is difficult to obtain polyesters, the molecules of which are substantially completely terminated with hydroxyls and which, therefore, are of low acid value. If no catalyst is used, long cooks or high temperatures are required if an acid number below 10 is to be obtained. If paratoluene sulfonic acid is added to the reaction mixture, it is possible to attain an acid number as low as 3 or even 2½ in about 6 to 6½ hours. Usually, it is necessary to employ about a 10 percent excess of the glycol component, if polyesters of low acid number are to be obtained with p-toluenesulfonic acid as a catalyst.

(C) Another objection to p-toluenesulfonic acid as a catalyst resides in the fact that quite substantial amounts, e.g., about 0.1 to about 0.5 percent by weight based upon the reaction charge, is usually required.

(D) Another serious objection to polyesters prepared by use of p-toluenesulfonic acid as a catalyst resides in the fact that the polyesters obtained possess poor stability in the presence of moisture and at elevated temperatures.

In United States Patent 2,720,507 to J. R. Caldwell, it is disclosed that certain compounds of tin, containing alkali metal or alkaline earth metal groups or hydrocarbon groups attached directly to the metal, are effective catalysts of the ester interchange between esters of monohydric alcohols and certain complex polycarboxylic acids, to form polyesters. A necessary condition in this use of tin compounds, containing hydrocarbon groups attached directly to the metal, resided in the fact that water must be kept from the reaction zone. This, of course, precludes the use of these compounds in direct esterification between the polyol and a polycarboxylic acid or the anhydride thereof, since the latter types of reaction are inherently attended by the evolution of considerable amounts of water.

This invention is based upon the discovery that salts of tin, containing no hydrocarbon groups directly attached to the metal, and notably the halides of tin, constitute remarkably efficient catalysts of direct esterification reaction between polycarboxylic acids (or anhydrides thereof) and polyols, and the evolved water does not adversely affect the reaction.

Important advantages of the use of these materials in the esterification reaction may be listed as follows:

Very fast cooks of the esterification mixture at moderate temperatures can be obtained;

Very low acid values, e.g., of 2 or even less, are very readily obtained in the cooking operation even when practically theoretical amounts of a polyol are employed; acid values of about 1 can be obtained with a glycol excess of 3 percent or even less;

The color of the polyesters obtained when a salt of tin, containing no hydrocarbon groups directly attached to the metal, is used as a catalyst is excellent, it being quite possible to obtain polyesters often in a nearly water-white state.

Polyesters of very high hydrolytic stability may be obtained.

Still another important feature of this invention resides in the discovery that when a salt of tin, containing no hydrocarbon groups directly attached to the metal, is used as a catalyst, the color of the product can be still further improved by treating the product with a small amount (about 0.01 to about 1 percent by weight based upon the mixture) of carbon black. The latter can be filtered off at the end of the reaction with the aid of diatomaceous earth, leaving a beautifully clear (water-white) polyester.

In considering the materials which can be effectively used in the practice of the present invention, it will be apparent that the tin salts herein disclosed may be employed in the esterification of a great many polycarboxylic acids and a great many polyols. In performing the esterification reaction, either the acids or anhydrides (where they exist) may be used. In any event, the ultimate polyester is the same regardless of whether the reaction is initiated with the free polycarboxylic acid or its anhydride. The term "acid" as used herein, therefore, is often intended to include both the acid and the anhydride thereof.

Polyesters of the following representative polycarboxylic acids which are free of alpha, beta-ethylenic unsaturation may be prepared:

| | |
|---|---|
| Dimer acids [1] | Sebacic acid |
| Adipic acid | Azelaic acid |
| Succinic acid | Isosebacic acid |
| Phthalic acid | Fumaric acid |
| Isophthalic acid | Malic acid |
| Terephthalic acid | Glutaric acid |
| Diglycolic acid | Diphenic-acid |
| Oxalic acid | |

[1] The term "dimer acids" as employed herein includes those acids containing a plurality of carboxyls and which result through Diels-Alder ethylenic reaction of drying oil acids such as linoleic acid or linolenic acid or mixtures of the two in well-known manner.

The mixtures of any two or more of these acids are included in amounts of about 1 to about 50 percent, the rest of the mixture being 1 or more of the remaining acids.

The foregoing list of acids, it is to be emphasized, is but illustrative and therefore but partial. Manifestly, many other polycarboxylic acids may also be employed if so desired.

Likewise, the principles of the present invention are applicable to the use of a relatively wide range of polyols. Some of these usually are glycols, of which the following constitutes a partial list from which selection can be made:

Ethylene glycol
Propylene glycol
Diethylene glycol
Dipropylene glycol
Triethylene glycol
Neopentyl glycol
1,4-butane-diol
1,5-pentane diol
Trimethylene glycol
Polyethylene glycol
Polypropylene glycol Mixtures of any two or more of these diols are included.

Often, the glycols above enumerated are mixed with appropriate amounts of a polyol containing three or more (e.g., up to six) hydroxyl groups and being represented by:

Trimethylol ethane
Trimethylol propane
Glycerol
1,2,6-hexane triol
Pentaerythritol
Sorbitol
Methyl glycoside
Mannitol Polyols may also be used without the diol component.

The diol and polyol components are employed in an amount theoretically to react with all carboxyls and to give hydroxyls imparting desired hydroxyl values (e.g., 40 to 700) to the polyester.

Usually, though not always, the reaction is also conducted in the presence of an appropriate non-reactive liquid diluent, which may be selected to provide a constant boiling mixture with the water evolved in the reaction, but being insoluble in water. Such diluents facilitate the removal of water from the reaction zone and thus cause the reaction to go in the desired direction. Appropriate diluents of this type comprise liquid aromatic hydrocarbons such as diluents useful in esterification reactions to form polyesters. However, it is an advantage of the salts of tin as catalysts that they can also be used with effect in fusion cooks in the absence of liquid diluents.

Tin salts from which selections can be made to catalyze the esterification reaction between polycarboxylic acids and polyols of the foregoing types include such materials as:

Stannic oxalate
Stannous oxalate
Stannous acetate
Stannous nitrate
Stannic nitrate
Stannous sulfate
Stannous pyrophosphate
Stannous chromate
Basic tin chloride (SnOCl$_2$)
Stannous chloride [1] (either SnCl$_2$.2H$_2$O or SnCl$_2$)
Stannous bromide
Stannous iodide
Stannous fluoride
Stannic chloride
Stannic bromide
Stannic fluoride
Stannic iodide

[1] Both forms are operable but the anhydrous is more stable and is more concentrated and, therefore, is preferred. The halides of tin are considered to be particularly desirable.

It is an important advantage of the present invention that the tin salts employed as the catalyst of esterification may be employed in minimal amounts, in percentages, e.g., in a range of about 0.001 to about 0.2 percent by weight based upon the mixture. However, higher amounts are also effective though unnecessary and, in general, are not preferred. In any event, the amount of catalyst is relatively small as compared with the total volume of material to be treated.

In conducting the esterification reaction contemplated by this invention, any convenient form of esterification apparatus may be employed; for example, it may assume the form illustrated in the copending application of Carl C. Georgian and Robert A. Wavering, Serial No. 418,140, filed March 23, 1954. In those instances in which the polyol component tends to be volatile and to escape from the reaction zone, recovery procedures such as disclosed in the foregoing application are applicable.

The glycol recovery process of said application, also applicable in this case, comprises cooking in a kettle, a mixture of a polyol such as propylene glycol and a dicarboxylic acid (or its anhydride). The vapors from the kettle, including water of reaction, some glycol and solvent are passed through a glycol recovery column, in the top of which they are washed with water at a temperature approximately corresponding to that of boiling of a constant boiling mixture of solvent and water. The glycol is thus washed from the vapor mixture and returns down the column to the kettle. The vapors of solvent and water in the proportions of a constant boiling mixture, pass over, are condensed and are separated.

In conducting the reaction in said apparatus, but with tin or a compound thereof as a catalyst, the tin or a compound thereof and the reactants are introduced into about 5 to 15 percent of a nonreactive solvent designed to form a constant boiling mixture with and thus to remove water. Appropriate media include xylene, toluene and benzene already referred to and other solvents which do not enter into the reaction, which form constant boiling mixtures with water and which are insoluble in water. The vapors may be washed with water in the top of the column to prevent polyol losses, but this is a non-essential refinement of technique.

The apparatus and techniques of the foregoing patent application are optional. In many instances, polyol recovery from the reaction vapors from the kettle is not required. In that event, the diluent is simply distilled to remove water of reaction from the reaction zone. The diluent after condensation and separation of water, can be recirculated.

As already stated, it is an advantage of the present invention that the reaction mixture can easily be cooked to a very low acid value, for example, below 3 and usually below 1. Therefore, if evaporational losses are prevented, it seldom is necessary to employ any great excess of polyol component beyond that which is actually used up in the reaction in the esterification of the carboxyls and in the provision of terminal hydroxyls on the polyester chains. A 3 percent or even smaller excess is usually sufficient, though higher percentages, for example, 5 percent or more, may be employed if so desired. Such techniques usually do not favor economy of operation.

In those instances in which the reaction is employed to provide polyesters containing hydroxyls adapting them for reaction with diisocyanate such as tolylene diisocyanate, to form polyurethane resins, tailoring of the polyesters to meet particular requirements may be necessary. Those polyesters employed in the formation of more soft and flexible types of polyurethane foams generally comprise relatively long chains of alternating polyhydric alcohol residues and polycarboxyl acid residues, the terminal units being the polyhydric alcohol or polyol component and the intermediate portion of the chains comprising polycarboxylic acid and polyhydric alcohol components in alternation. Even in the polyesters used to form soft foams, some branching of the chain is usually provided by inclusion of a small amount of a polyol containing three or more hydroxyls, in which instance hydroxyls dispersed at intervals along the chain as a backbone may occur. Due to the type of polyester, a relatively large number of the glycol and polycarboxylic components will occur in the chain; usually the chain averages about 15 to about 20 or more of each of the residues. These polyesters are usually of comparatively low hydroxyl value as well as low acid value. For the flexible foams, the hydroxyl value ordinarily will be in a range of about 40 to about 75.

In order to obtain polyesters useful for the preparation of rigid-type foams, it is desirable to increase the content of polyol containing three or more hydroxyls as compared with the diol content. The resultant polyesters are of relatively short chain lengths seldom containing more than 5 polyol units in any given length and are characterized by a higher degree of branching, thus proportionally providing a great many more termini for hydroxyl groups. These polyesters usually are of relatively high hydroxyl value, e.g., 200 or more. Of course, it is also contemplated to tailor the polyesters in such manner as to provide for the formation of foams of intermediate hardness. Cooking of the polyesters is continued until the acid value has dropped to a point commensurate with the requirements of the application to which the material is to be put, usually to a range below 3, often to nearly zero. This capacity for esterifying the polyesters to such low acid values smoothly and quickly without the use of large excesses of polyol is unusual in catalysts.

The use of salts of tin free of hydrocarbon groups attached to the metal, in the preparation of polyesters suitable for use in the manufacture of polyurethane foams is illustrated by the following examples:

EXAMPLE I

This example illustrates the use of a tin salt catalyst in the preparation of a polyester also useful in forming foams, by reaction with tolylene diisocyanate. The polycarboxylic acid in this instance, is a so-called dimer acid obtained by Diels-Alder reaction of drying oil acids; techniques of preparing such acids are illustrated in many articles and patents such as:

Journal of the American Chemical Society, March, 1947, pp. 65–68.
Paint and Oil Chemical Review, January 4, 1954, pp. 13, 14, 16, 26, 28 and 29.
United States Patent No. 2,482,760.
United States Patent No. 2,482,761.

A commercial grade of these dimer acids sold under the trade name of Emery Acid 3065–S, is quite suitable for use in the preparation of polyesters by employing as a catalyst, a tin-containing salt in accordance with the provisions of the present invention.

The components of an appropriate polyester may be listed as follows:

| | Parts by weight |
|---|---|
| Dimer acid (Emery 3065–S) | 72.7 |
| Triethylene glycol | 25.3 |
| Trimethylol ethane | 2.0 |

Stannous chloride 0.01 percent by weight based upon the mixture, is also added.

An appropriate schedule for the esterification reaction is as follows: the dimer acids, triethylene glycol and the catalyst are heated to 300° F. for 1 hour under total reflux. At the end of that time, reflux is discontinued and the mixture is heated to about 465° F. until the acid value is brought within a range of 20–25. The trimethylol ethane is then added and the mixture is heated at the foregoing temperature (465° F.) until the acid value has dropped to 10. The reaction mixture is then blown with inert gas (e.g., $CO_2$) to aid in the removal of water, cooking being continued at the foregoing temperature, until a viscosity of V to a W at 75 percent solids in monoethyl ether of ethylene glycol is obtained. This corresponds to a viscosity of 18,000 to 27,000 centipoises at 77° F. and at 100 percent solids content. The final polyester has an acid number less than 3, often below 1, and a hydroxyl number below 70. This polyester is suitable for use in the preparation of soft, flexible foams by reaction with tolylene diisocyanate.

Normally, this polyester is complete in about 4 hours with catalysts and in 8 to 9 hours without catalyst.

In this reaction, the triethylene glycol can be replaced by diethylene glycol though the resultant polyester tends to be more viscous.

EXAMPLE II

In this example, a number of different tin salts were employed as catalysts in the preparation of a polyester of low hydroxyl value, low acid number and being particularly well adapted for use in the preparation of flexible polyurethane foams. This polyester was employed in the tests because it is of a type which is particularly difficult to prepare by conventional methods. The polyester components comprised:

| | Moles |
|---|---|
| Adipic acid | 10.0 |
| Diethylene glycol | 10.3 |
| Trimethylol propane | 0.55 |

In most instances, tin salts were added to this mixture in an amount of about 0.1 to 0.01 percent by weight based upon the total charge.

In each run, the mixture was charged into an appropriate container for cooking polyesters, the container being equipped in conventional manner with electrical heating means, a stirrer, temperature recording means, and a reflux type packed column. The top of the column was also equipped with a condenser, which was further connected to a separator type trap adapted to separate water of reaction from condensed solvent and to return the solvent to the reaction zone in the container. The container was also provided with an inlet for the introduction of inert gas, such as carbon dioxide or nitrogen, designed to assist in the exclusion of, or removal of oxygen and also in the removal of water vapors from the reaction vessel. The apparatus was provided with appropriate seals to prevent, insofar as practicable, the introduction of air into the container and also to prevent uncontrolled loss of vapors.

In some instances, the tin salt employed as a catalyst was added initially, while in others, the reaction was allowed to proceed to produce initial esterification without catalyst, either technique is successful.

In conducting the reaction, heat was initially placed at maximum in order to melt all of the solid monomeric material and the agitator was started as soon as possible in order to insure uniform melting and heating of the mixture. The influx or introduction of inert gas to blanket the mixture was initiated after all components were melted.

The temperature of reaction was maintained at about 195° C. and at this temperature, water was evolved and taken off through the separator. Solvent, either toluene or xylene, was added to the batch to establish reflux and refluxing was continued at 195° C. in the container until the acid number of the batch, as determined by conventional tests, had dropped at least to 15 or 20. In some instances, the batch could be held at this temperature until an acid number of 2.5 had been attained. In any event, the reaction was run to completion, if necessary, with an increase of the temperature in the reaction zone to a range of 220° C. to 240° C. until the desired acid value had been attained. The time taken to reach an acid value of 2.5 is considered as the time of cook. The solvents were removed from the product at the conclusion of the reaction by blowing the product with inert gas. Blowing was continued until a Gardner-Holdt bubble viscosity of $Z5+\frac{1}{4}$ at 100 percent solids was obtained. During this time, the acid value usually dropped even further, for example, to 1 or 2.

A number of significant tests, including acid numbers, color checks by both the APHA and the Gardner methods, were conducted upon the product. Likewise, the hydroxyl numbers were checked and tests were made to determine hydrolytic stability. In the latter test, the change in acid number of a resin sample after an exposure to a temperature of 158° F. under an atmosphere of 90 to 100 percent relative humidity for a period of 24 hours was observed. A change in acid number of 1 or less is considered satisfactory.

The tin salt employed, the solvent medium employed in the reaction, the time of reaction, the temperature required to obtain an acid number of 2.5, the Gardner color, the APHA color, the hydrolytic stability, and the comments upon the rate of cook, the stability of the product, and the color of the product for each charge, are tabulated under appropriate headings in Tables I and II. Table I contains the data from the preparation of resins without the colorization treatment. In Table II, the resin was treated with carbon black (Darco). Diatomaceous earth (Celite) was added about 30 minutes before filtration to aid in the removal of the carbon black.

Xylene is added as a diluent. The mixture is catalyzed with 0.005 percent by weight based upon the mixture, of $SnCl_2$ and is cooked to an acid number of 1.5 in 4.25 hours. The polyester has a hydroxyl number of 426 and is particularly useful in the preparation of extremely

*Table I*

| Catalyst | Conc., percent | Time, hours | Temp., °C. | Solvent | Color Gard. | Color APHA | Hydrolytic stability | Comments |
| --- | --- | --- | --- | --- | --- | --- | --- | --- |
| Stannous chloride | 0.1 | 5.1 | 195 | Toluene | −1 | 175 | 0.49 | Fast cook; good color and hydrolytic stability. |
| Stannic chloride | 0.01 | 3.9 | 220 | do | 1 | 190 | 0.52 | Fast cook; good color. |
| Stannous chloride (anhydrous) | 0.01 | 3.4 | 220 | Xylene | −1 | 140 | 0.12 | Fast cook; excellent color. |
| Stannous chloride (dihydrate) | 0.01 | 3.8 | 220 | do | 1 | 195 | 0.08 | Fast cook; good color. |
| Stannous fluoride | 0.0083 | 3.7 | 220 | do | −1 | 110 | | Fast cook; excellent color. |
| Stannous pyrophosphate | 0.021 | 7.6 | 220 | Toluene | 1 | 240 | | Medium cook; fair color. |

*Table II*
STANNOUS CHLORIDE DIHYDRATE

| Conc., percent | Time, hours | Temp., °C. | Solvent | Treatment | Gard. | APHA | Hydrolytic stability | Comments |
| --- | --- | --- | --- | --- | --- | --- | --- | --- |
| 0.001 | 5.9 | 240 | Toluene | 0.3% Celite | 1 | 185 | | Fast cook; good color. |
| 0.0025 | 5.9 | 240 | do | do | 1 | 185 | | Do. |
| 0.005 | 5.3 | 195 | do | do | 1–2 | 230 | | Fast cook; fair color. |
| 0.005 | 3.6 | 220 | Xylene | do | 1 | 190 | | Fast cook; good color. |
| 0.005 | 3.0 | 240 | Toluene | do | −1 | 150 | | Do. |
| 0.005 | 3.8 | 240 | do | 0.3+% Celite, 0.1% Darco | −1 | 70 | 0.11 | Fast cook; outstanding resin color. |
| 0.005 | 3.5 | 240 | Xylene | 0.3% Celite, 0.1% Darco | −1 | 80 | 0.05 | Do. |
| 0.01 | 5.5 | 195 | Toluene | None | 1 | 175 | 0.08 | Fast cook; good color. |
| 0.01 | 4.1 | 220 | do | do | 1 | 175 | 0.21 | Do. |
| 0.01 | 3.8 | 220 | Xylene | do | 1 | 195 | 0.08 | Do. |
| 0.01 | 4.1 | 220 | Toluene | 0.3+% Celite, 0.1% Darco | −1 | 90 | 0.15 | Fast cook; very good color. |
| 0.01 | 3.6 | 220 | do | 0.8+% Celite, 0.2% Darco | −1 | 65 | 0.06 | Fast cook; outstanding resin color. |
| 0.01 | 3.8 | 220 | do | 1.2+% Celite, 0.3% Darco | −1 | 60 | | Fast cook; water-white resin. |
| 0.01 | 3.0 | 240 | do | None | 1 | 190 | 0.03 | Very fast cook; good color. |
| 0.03 | 3.0 | 220 | Xylene | do | 1–2 | 245 | 0.54 | Very fast cook; fair color. |
| 0.05 | 5.3 | 195 | Toluene | do | 1 | 190 | 0.13 | Fast cook; good color. |
| 0.05 | 3.3 | 220 | do | do | 2–3 | 275+ | 0.24 | Fast cook; poor color. |
| 0.05 | 3.3 | 220 | do | 0.3+1% Celite, 0.1% Darco | −1 | 110 | 1.0 | Fast cook; very good color. |

EXAMPLE III

The following example illustrates the preparation of a polyester of relatively high hydroxyl value and being well designed for use in the preparation af more rigid polyurethane foams. The components and the molecular ratios of the components of this polyester are as follows:

| | Moles |
| --- | --- |
| Adipic acid | 11.0 |
| Trimethylol propane | 11.8 |
| Diethylene glycol | 5.6 |

This mixture is catalyzed with 0.01 percent based upon the mixture of the dihydrate of stannous chloride. The mixture is also diluted with a reflux amount of toluene as an azeotropic solvent. The mixture is heated in an appropriate apparatus, such as a kettle, in accordance with the provisions of the foregoing examples, at a temperature of 195° C. Water is evolved and the reaction is completed within a period of 5 hours. The product has an acid number of 1, a hydroxyl value of 370 and a viscosity of 21,000 cps. at 77° F. This polyester is well adapted for mixing with tolylene diisocyanate and water or halogenated hydrocarbons, to form a polyurethane foam of rigid type. The latter reaction is conducted in accordance with conventional techniques for the preparation of rigid foams.

In a similar mixture, in which catalyst is omitted, the batch requires 14.25 hours to cook to the foregoing viscosity.

EXAMPLE IV

This example illustrates the preparation of a rigid foam using a mixture of dibasic acids. Only triols are used as the polyol component.

The reaction mixture comprises:

| | Moles |
| --- | --- |
| Adipic acid | 3.0 |
| Phthalic acid | 1.5 |
| Trimethylol propane | 6.8 | tough, rigid foams which are serviceable at relatively high temperatures.

Other dibasic acids such as fumaric acid, maleic acid, isophthalic acid and succinic acid, may be used in the place of phthalic acid. Mixtures of triols are also useful for some purposes.

EXAMPLE V

This example is illustrative of the use of a tin salt as a catalyst in a so-called fusion cook, in which solvents are omitted. The esterifiable charge comprises:

| | Moles |
| --- | --- |
| Adipic acid | 10.5 |
| Diethylene glycol | 10.6 |
| Trimethylol propane | 0.55 |
| Stannous chloride (anhydrous) | 0.01 |

This mixture is cooked at 220° C. for a period of 8 hours, in order to obtain an acid number of 2.5 or lower. The polyester is well adapted for mixing with tolylene diisocyanate to form polyurethane resins.

A fusion control batch comprising the same components, except for the omission of catalyst, when similarly cooked required a period of 23 hours to obtain a corresponding stage of esterification.

The salts of tin, it will be observed, resulted in very fast cooks and the resultant polyesters were of very good stability, color and other desirable properties. These polyesters were all well adapted for use with diisocyanate, such as toluene diisocyanate, in the preparation of polyurethane foams.

It is observed that stannous and stannic halides when used in catalytic amounts in the mixtures of polyesters and polyols, are substantially non-corrosive to the metals customarily used in the apparatus. This is perhaps due to the fact that the catalyst is effective in such low concentration.

Emphasis has been placed upon the preparation of polyesters which can be emulsified with water and reacted with a diisocyanate such as tolylene diisocyanate, to form foams. If the water is omitted, little or no foaming occurs. This is desirable in coating compositions and other non-foamed polyurethane resins. The tin salt, therefore, can be used to prepare polyesters similar to those above described which are reacted with isocyanates, in the absence of water, to provide polyurethane coatings.

The catalysts of this invention can also be mixed with mixtures of acids such as phthalic acid and fatty acids such as stearic acid, oleic acid and linoleic acid, and cooked with polyols such as glycerol, to provide alkyd resins useful in coatings.

We claim:

1. A method of preparing a polymeric polyester which comprises forming a mixture of an alcohol containing a mixture of at least two hydroxyls, an acid compound selected from the class consisting of a dicarboxylic acid free of alpha, beta-ethylenic unsaturation and the anhydride of said acid, and about 0.001 to about 0.2 percent by weight based upon the mixture of a catalyst which is a salt of components consisting of tin and halogen, and heating the mixture to a temperature effective to evolve water directly to form said polyester from said alcohol and said acid compound, and removing the water as it is evolved heating being continued until an acid value below 10 is attained, said alcohol and said acid compound consisting of atoms of carbon, hydrogen and oxygen, and said alcohol being present in an amount to provide an ester product having a hydroxyl number in a range between 40 and 700, and said acid compound being present in a free state in the mixture along with the tin salt.

2. A method of preparing a polymeric polyester which comprises forming a mixture of an alcohol containing at least two hydroxyls, an acid compound selected from the class consisting of a dicarboxylic acid free of alpha-beta-ethylenic unsaturation and the anhydride thereof, adding to said mixture about 0.001 to about 0.2 percent by weight based upon the mixture of a catalyst which is a salt of components consisting of tin and halogen, and a liquid aromatic diluent which is adapted to form a constant boiling mixture with water evolved in the reaction, heating being at a temperature to effect removal of vapors of water and said diluent, said alcohol and said acid compound each consisting of atoms of carbon, hydrogen and oxygen, and said alcohol being present in an amount in excess of equivalency with respect to said acid compound, and said acid compound being present in free state in the mixture along with the tin salt, whereby directly to polyesterify said alcohol and said acid compound.

3. The method of claim 1 in which carbon black is added to the reaction mixture and is removed at the end of the reaction, whereby to provide water-white polyesters.

4. The method of claim 1 in which the catalyst is stannous chloride.

5. The method of claim 1 in which the mixture is cooked in the presence of a nonreactive liquid diluent adapted to form a constant boiling mixture with the evolved water.

6. The method of claim 5 in which the diluent is of a class consisting of xylene, toluene and benzene.

7. A method of preparing a polymeric polyester which comprises forming a mixture of an alcohol containing at least two hydroxyls and an acid compound selected from the class consisting of dicarboxylic acids free of alpha, beta-ethylenic unsaturation and the anhydride thereof, and a catalyst which is selected from the group consisting of (A) a salt of components consisting of tin and fluorine, and (B) hydrates of said salts, the salt being present in an amount in a range of about 0.001 to about 0.2 percent by weight based upon the reactants, and heating the mixture to a temperature to evolve water directly, removing the water from the reaction zone as it is evolved whereby to form said polyester from said alcohol and said acid compound, said alcohol and said acid compound each consisting of atoms of carbon, hydrogen and oxygen, and said alcohol being present in an amount in excess of equivalency with respect to said acid compound, and said acid compound being present in a free state in the mixture along with the salt of tin, heating being continued until the polyester product has an acid number below about 3.

8. The method according to claim 1 wherein the acid compound comprises adipic acid.

References Cited in the file of this patent

UNITED STATES PATENTS

| 2,257,384 | Johnston | Sept. 30, 1941 |
| 2,578,660 | Auspos et al. | Dec. 18, 1951 |
| 2,634,251 | Kass | Apr. 7, 1953 |
| 2,720,507 | Caldwell | Oct. 11, 1955 |
| 2,892,815 | Hobson | June 30, 1959 |

FOREIGN PATENTS

| 796,621 | Great Britain | June 18, 1958 |

UNITED STATES PATENT OFFICE

CERTIFICATE OF CORRECTION

Patent No. 3,057,824                October 9, 1962

Louis R. Le Bras et al.

It is hereby certified that error appears in the above numbered patent requiring correction and that the said Letters Patent should read as corrected below.

Column 5, line 64, for "complete" read -- completed --; column 7, line 42, for "af" read -- of --; column 8, line 50, for "10.5" read -- 10.0 --.

Signed and sealed this 31st day of March 1964.

(SEAL)
Attest:
ERNEST W. SWIDER

EDWARD J. BRENNER

Attesting Officer

Commissioner of Patents